US012650735B2

(12) United States Patent
Liu

(10) Patent No.: US 12,650,735 B2
(45) Date of Patent: Jun. 9, 2026

(54) METHOD OF CALLING APPLICATIONS, DEVICE, AND MEDIUM

(71) Applicant: Beijing Zitiao Network Technology Co., Ltd., Beijing (CN)

(72) Inventor: Chin-Wei Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 222 days.

(21) Appl. No.: 18/545,787

(22) Filed: Dec. 19, 2023

(65) Prior Publication Data

US 2024/0248544 A1 Jul. 25, 2024

(30) Foreign Application Priority Data

Jan. 19, 2023 (CN) .......................... 202310082779.5

(51) Int. Cl.
*G06F 3/01* (2006.01)
*G06F 3/04815* (2022.01)
*G06F 3/04817* (2022.01)

(52) U.S. Cl.
CPC .......... *G06F 3/017* (2013.01); *G06F 3/04815* (2013.01); *G06F 3/04817* (2013.01)

(58) Field of Classification Search
CPC .. G06F 3/017; G06F 3/04815; G06F 3/04817; G06F 3/011; G06F 3/013; G06F 3/0482; G06F 9/451; G06F 3/0483; G06F 3/04883
See application file for complete search history.

(56) References Cited

U.S. PATENT DOCUMENTS

2017/0053447 A1* 2/2017 Chen ........................ G06T 17/20
2023/0105621 A1* 4/2023 Karri ..................... H04L 65/403
                                                                345/419
2023/0315247 A1* 10/2023 Pastrana ............... G06F 1/1626
                                                                715/716

FOREIGN PATENT DOCUMENTS

CN          113391734      *  9/2021
CN          113391734 A       9/2021

* cited by examiner

*Primary Examiner* — Cao H Nguyen
(74) *Attorney, Agent, or Firm* — BakerHostetler

(57) ABSTRACT

The present disclosure provides a method and an apparatus of calling applications, a device, and medium. The method includes: displaying an application navigation interface in the extended reality space in response to a call-out instruction of the application navigation interface, the application navigation interface including applications categories displayed in category and icons or thumbnails of the applications contained in the application categories, and displaying a window of a first target application selected by a selection instruction of a first target object in the extended reality space in response to the selection instruction in the application navigation interface.

20 Claims, 8 Drawing Sheets

Displaying an application navigation interface in an extended reality space in response to a call-out instruction of the application navigation interface, wherein the application navigation interface comprises application categories displayed in category and icons or thumbnails of applications contained in the application categories — S101

Displaying a window of a first target application selected by a selection instruction of a first target object in the extended reality space in response to the selection instruction in the application navigation interface, wherein the selection instruction is used to select applications corresponding to an application category or select an application — S102

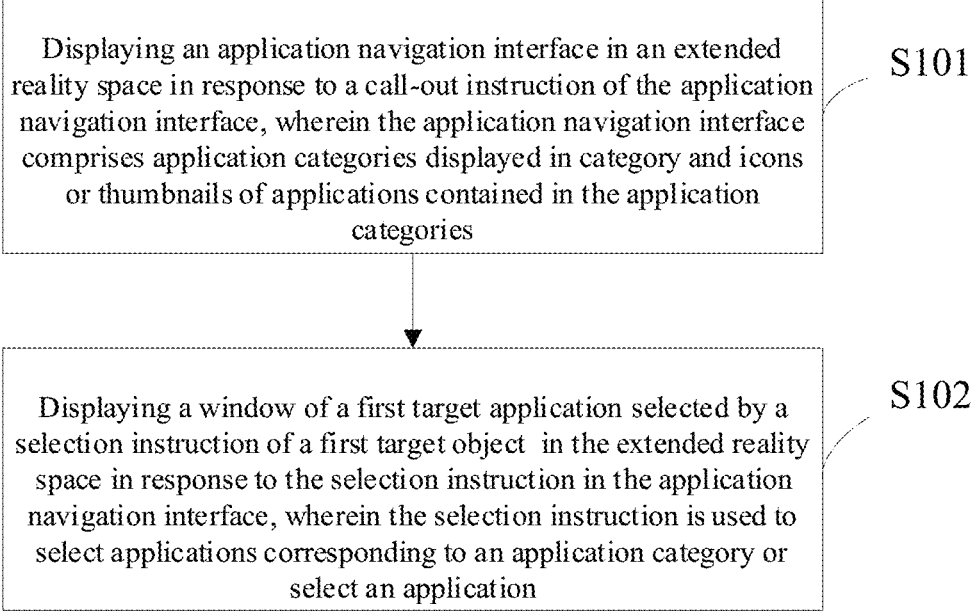

Displaying an application navigation interface in an extended reality space in response to a call-out instruction of the application navigation interface, wherein the application navigation interface comprises application categories displayed in category and icons or thumbnails of applications contained in the application categories

S101

Displaying a window of a first target application selected by a selection instruction of a first target object in the extended reality space in response to the selection instruction in the application navigation interface, wherein the selection instruction is used to select applications corresponding to an application category or select an application

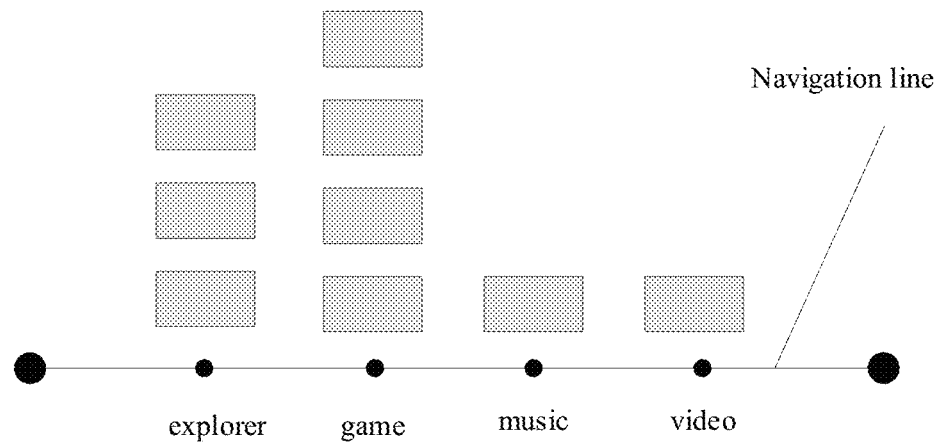

Navigation line explorer     game     music     video

FIG.2 explorer     game     music          video

Windows of application(s)

Windows of application(s)

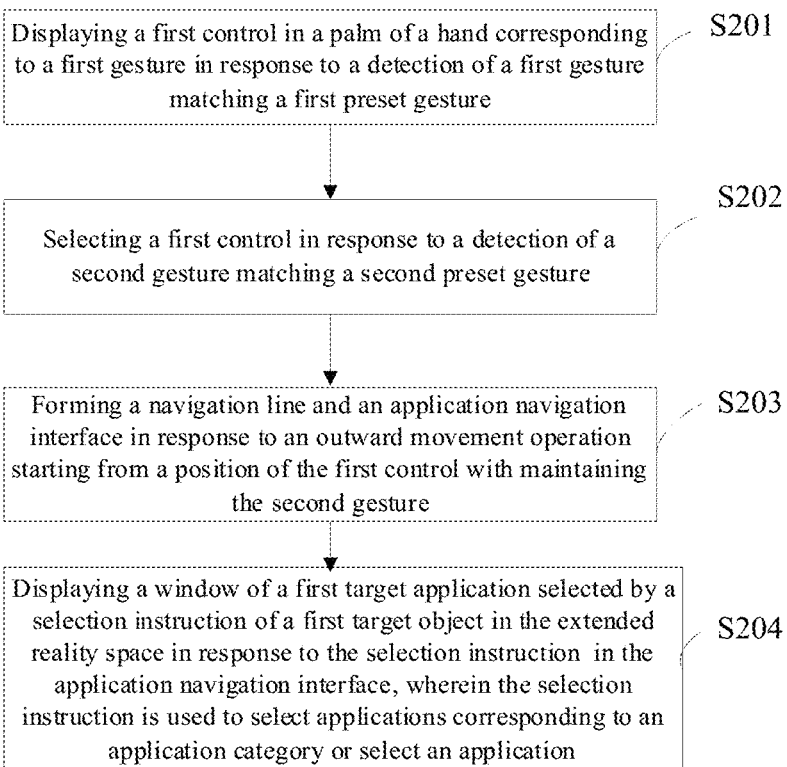

Displaying a first control in a palm of a hand corresponding to a first gesture in response to a detection of a first gesture matching a first preset gesture — S201

Selecting a first control in response to a detection of a second gesture matching a second preset gesture — S202

Forming a navigation line and an application navigation interface in response to an outward movement operation starting from a position of the first control with maintaining the second gesture — S203

Displaying a window of a first target application selected by a selection instruction of a first target object in the extended reality space in response to the selection instruction in the application navigation interface, wherein the selection instruction is used to select applications corresponding to an application category or select an application — S204

FIG.7 explorer game music video d

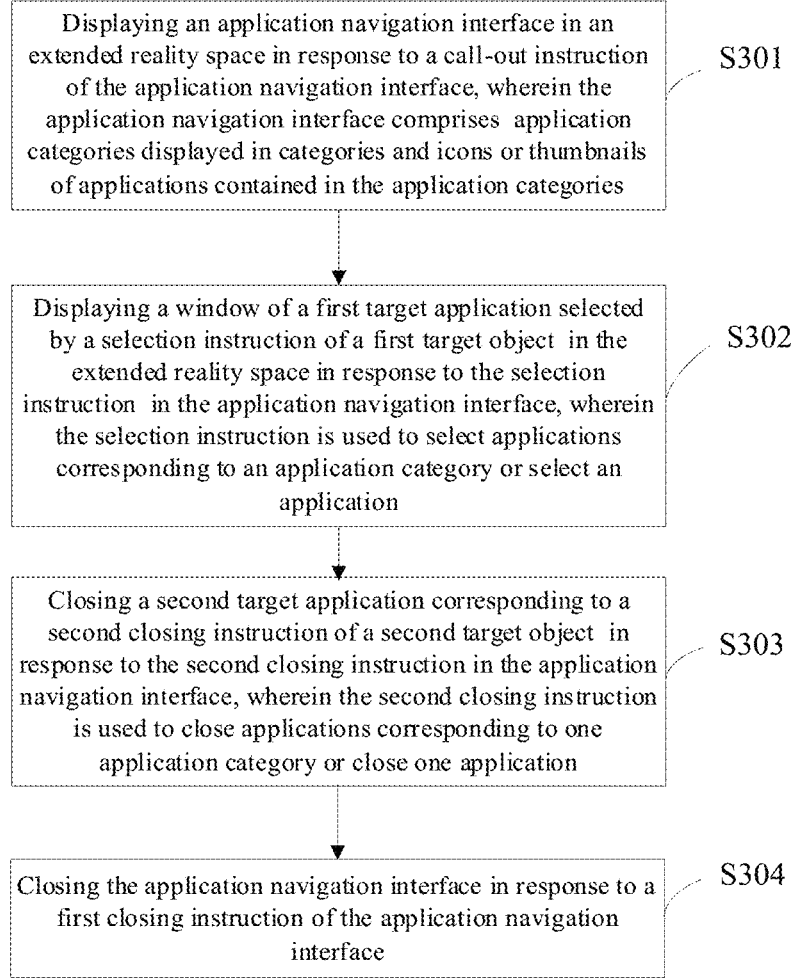

Displaying an application navigation interface in an extended reality space in response to a call-out instruction of the application navigation interface, wherein the application navigation interface comprises application categories displayed in categories and icons or thumbnails of applications contained in the application categories — S301

Displaying a window of a first target application selected by a selection instruction of a first target object in the extended reality space in response to the selection instruction in the application navigation interface, wherein the selection instruction is used to select applications corresponding to an application category or select an application — S302

Closing a second target application corresponding to a second closing instruction of a second target object in response to the second closing instruction in the application navigation interface, wherein the second closing instruction is used to close applications corresponding to one application category or close one application — S303

Closing the application navigation interface in response to a first closing instruction of the application navigation interface — S304

FIG.9

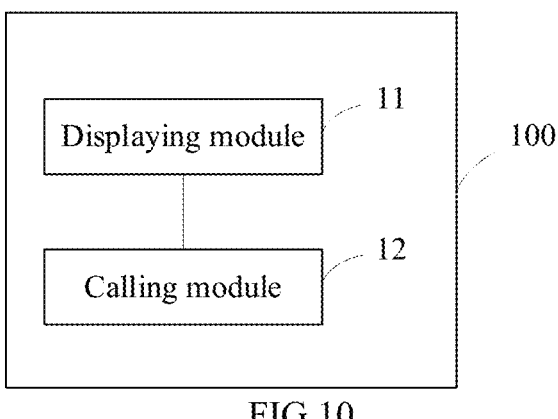

Displaying module — 11

Calling module — 12

METHOD OF CALLING APPLICATIONS, DEVICE, AND MEDIUM

CROSS-REFERENCE TO RELATED APPLICATION

The present disclosure claims priority of the Chinese Patent Application No. 202310082779.5 filed on Jan. 19, 2023, the disclosure of which is incorporated herein by reference in its entirety as part of the present application.

TECHNICAL FIELD

Embodiments of the present disclosure relate to a method of calling applications, a device, medium, and a program product.

BACKGROUND

Extended Reality (XR) refers to a human-machine inter-actable virtual environment created by combining reality and virtuality via a computer, which is also a general term for multiple technologies, such as, Virtual Reality (VR), Augmented Reality (AR) and Mixed Reality (MR). By integrating visual interaction technologies of the three, an "immersive sense" with seamless transition between the virtual world and the real world is brought to an experiencer.

At present, in VR devices, a user finds an icon of an application to be opened on the desktop, and clicks the icon of the application to open the application. When the user needs to open a plurality of applications, they have to find the applications one by one and open them. When the user opens the plurality of applications, the plurality of applications can be simultaneously tiled to display in the virtual reality space, and only one application can also be displayed in the virtual reality space while the other applications can be switched to run in a background. The applications running in the background are displayed in the dock bar, and the user can switch an application to run in a foreground by clicking on the application in the dock bar.

However, if there are many applications in the VR device, the existing method of calling the applications are cumbersome.

SUMMARY

Embodiments of the present disclosure provide a method of calling applications, comprising displaying an application navigation interface in an extended reality space in response to a call-out instruction of the application navigation interface, the application navigation interface comprising application categories displayed in category and icons or thumbnails of applications contained in the application categories; and displaying a window of a first target application selected by a selection instruction of a first target object in the extended reality space in response to the selection instruction in the application navigation interface. The selection instruction is used to select applications corresponding to an application category or select an application.

In some embodiments, the application navigation interface comprises a navigation line on which category marks are displayed at intervals, and the icons or thumbnails of the applications contained in each of the application categories are displayed in a row on a side of a corresponding category mark.

In some embodiments, the displaying the application navigation interface in the extended reality space in response to the call-out instruction of the application navigation interface comprises: displaying a first control in a palm of a hand corresponding to a first gesture matching a first preset gesture in response to a detection of the first gesture; selecting the first control in response to a detection of a second gesture matching a second preset gesture; and forming the navigation line and the application navigation interface in response to an outward movement operation starting from a position of the first control with maintaining the second gesture.

In some embodiments, the second gesture is a pinched posture of fingers, or the second gesture is a posture of finger pressing the first control.

In some embodiments, the method further comprises: automatically closing the application navigation interface after displaying the application navigation interface for a preset period of time.

In some embodiments, the method further comprises: closing the application navigation interface after displaying the window of the first target application.

In some embodiments, the method further comprises: closing the application navigation interface in response to a first closing instruction of the application navigation interface.

In some embodiments, the closing the application navigation interface in response to the first closing instruction of the application navigation interface comprises: selecting an endpoint of the navigation line in response to a detection of a third gesture matching a third preset gesture; and closing the application navigation interface in response to a movement operation of moving from the endpoint of the navigation line to a starting point of the navigation line with maintaining the third gesture.

In some embodiments, the applications on the application navigation interface are opened applications in an extended reality XR device.

In some embodiments, the method further comprises: closing a second target application corresponding to a second closing instruction of a second target object in response to the second closing instruction in the application navigation interface. The second closing instruction is used to close applications corresponding to one application category or close one application.

In some embodiments, the opened applications comprise applications running in a foreground and applications running in a background, and the applications running in the foreground and the applications running in the background are displayed differently.

In some embodiments, the selection instruction is a click operation of the application category or the application; and the first closing instruction is a long-press operation of the application category or the application.

In some embodiment, the applications on the application navigation interface comprise opened applications and unopened applications in the extended reality XR device, and the opened application and the unopened applications are displayed differently; the displaying the window of the first target application selected by the selection instruction of the first target object in the extended reality space in response to the selection instruction in the application navigation interface comprises: when the first target application is an unopened application, starting the first target application in response to the selection command, and displaying the window of the first target application in the extended reality space; and when the first target application is an opened application running in the background, switching the first target application to run in the foreground in response to the selection command.

In some embodiments, that the categories of the applications are automatically classified by an extended reality XR device.

In some embodiments, the categories of the applications are set by a user.

In some embodiments, the selection instruction is any one operation of the application categories or applications selected from the group consisting of: a click operation, a double-click operation or a long-press operation.

In some embodiments, when windows of a plurality of applications are displayed in the extended reality space, the windows of the plurality of applications are arranged to form M rows and N columns, wherein both M and N are positive integers, and at least one of M and N is greater than 1.

In some embodiments, the displaying the window of the first target application selected by the selection instruction of the first target object in the extended reality space in response to the selection instruction in the application navigation interface comprises: when a sum of a number of the first target applications and a number of the applications displayed in the extended reality space is less than or equal to a threshold of a number of windows that can be displayed in the extended reality space, displaying the window of the first target application in the extended reality space; when the sum of the number of the first target applications and the number of the applications displayed in the extended reality space is greater than the threshold of the number of windows that can be displayed in the extended reality space, closing the windows of a part of applications displayed in the extended reality space, and displaying the window of the first target application in the extended reality space; or when the sum of the number of the first target applications and the number of applications displayed in the extended reality space is greater than the threshold of the number of windows that can be displayed in the extended reality space, displaying a notice information configured to notice a user that a number of selected windows is greater than the threshold of the number of the windows that can be displayed in the extended reality space.

Embodiments of the present disclosure provide an apparatus of calling applications, comprising: a displaying module, configured to display an application navigation interface in an extended reality space in response to a call-out instruction of the application navigation interface, the application navigation interface comprising application categories displayed in category and icons or thumbnails of applications contained in the application categories; and a calling module, configured to display a window of a first target application selected by a selection instruction of a first target object in the extended reality space in response to the selection instruction in the application navigation interface. The selection instruction is used to select applications corresponding to an application category or select an application.

Embodiments of the present disclosure provide an electronic device, comprising at least one processor and a memory. The memory is configured to store a computer program, and the at least one processor is configured to call and run the computer program stored in the memory to perform any one of the above methods.

Embodiments of the present disclosure provide a computer-readable storage medium. The computer-readable storage medium is used to store a computer program which enables a computer to execute any one of the above methods.

Embodiments of the present disclosure provide a computer program product comprising a computer program. Any one of the above methods is implemented when the computer program is executed by at least one processor.

BRIEF SUMMARY OF THE DRAWINGS

In order to provide a better explanation of the technical solution in the embodiments of the present invention, a brief introduction will be given to the accompanying drawings of the description of the embodiments. Obviously, the accompanying drawings in the following description are only some embodiments of the present invention. For those skilled in the art, other accompanying drawings can be obtained based on these drawings without any creative work.

FIG. 1 is a flowchart of a method of calling applications provided in an embodiment of the present disclosure;

FIG. 2 is a schematic diagram of an application navigation interface;

FIG. 7 is a flowchart of a method of calling applications provided in another Embodiment of the present disclosure;

FIG. 9 is a flowchart of a method of calling applications provided in another Embodiment of the present disclosure;

FIG. 10 is a structural schematic diagram of an apparatus of calling applications provided in another embodiment of the present disclosure.

DETAILED DESCRIPTION OF THE INVENTION

Figure 3:
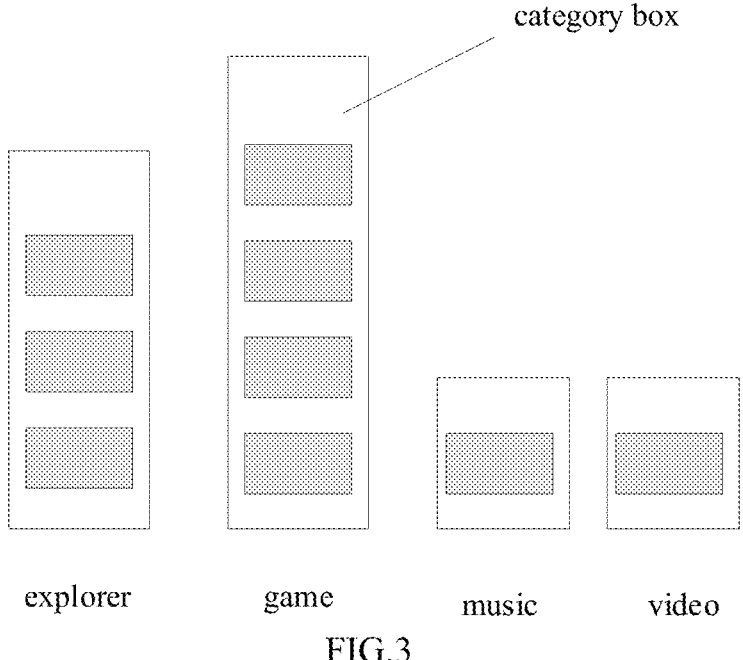
FIG. 3 is another schematic diagram of the application navigation interface.

The following will provide a clear and complete description of the technical solution in the embodiments of the present disclosure, in conjunction with the accompanying drawings. Obviously, the described embodiments are only a part of the embodiments of the present invention, not all of the embodiments of the present disclosure. Based on the embodiments of the present disclosure, all other embodiments obtained by those skilled in the art without creative work fall within the scope of protection of the present disclosure.

It should be noted that the terms "first", "second", etc. in the description and claims of the present invention, as well as the accompanying drawings, are used to distinguish similar objects, without necessarily describing a specific order or sequence. It should be understood that the data used in this way can be interchanged in appropriate cases, so that the embodiments of the present invention described here can be implemented in order other than those illustrated or described here. In addition, the terms "comprising" and "having", as well as any variations thereof, are intended to cover non-exclusive inclusion. For example, a process, method, system, product, or server that includes a series of steps or units, need not be limited to those clearly listed steps or units, but may include other steps or units that are not clearly listed or inherent to these processes, methods, products, or equipment.

To facilitate understanding of the embodiments of the present disclosure, before describing various embodiments of the present disclosure, some concepts involved in all the embodiments of the present disclosure are properly explained as follows:

1) Virtual Reality (referred as, VR), a technology for creating and experiencing a virtual world, determines to generate a virtual environment. It is a type of multi-source information (the Virtual Reality as mentioned herein at least comprises a visual perception, and can also comprise an auditory perception, a tactile perception, a motion perception, and even a taste perception, an olfactory perception, etc.), achieving a merging, interactable, three-dimensional, dynamic vision of a virtual environment and a simulation of entity behavior, so that the user is immersed in a simulated VR environment to achieve the use in multiple virtual environments, such as a map, a game, a video, an education, a medicine, a simulation, a cooperation training, a selling, assisted manufacturing, maintenance, and repairment.

2) Virtual Reality device (VR device), a terminal that achieves virtual reality effects, can usually be provided in form of glasses, Head Mount Display (HMD), and contact lenses to achieve the visual perception and other forms of perception. Of course, the forms of VR devices are not limited to the above, and can be further miniaturized or enlarged in accordance with practical requirements.

Optionally, the VR devices described in the embodiments of the present disclosure can comprise, but are not limited to, the following types:

2.1) Personal Computer Virtual Reality (PCVR) device, which utilizes a personal computer to perform calculations and data output related to the virtual reality functions. An external PCVR device achieves the virtual reality effects by utilizing the data output from the PC.

2.2) Mobile Virtual Reality device, which supports setting a mobile terminal (e.g., a smart phone) in various ways (e.g., a head-mounted display with dedicated card slot), performing calculations related to the VR functions by the mobile terminal through a wired or wireless connection to the mobile terminal, and outputting data to the mobile VR device, e.g., watching a virtual reality video via an APP in the mobile terminal.

2.3) All-in-One Virtual Reality device, which has at least one processor for performing related calculations of virtual functions so that it has independent VR input and outputs functions, does not need to be connected to a PC or a mobile terminal, and has a high freedom of use.

3) Mixed Reality (MR), which refers to combining real and virtual worlds to create a new environment and visualization, in which physical entities and digital objects co-exist and can interact with each other in real time to simulate real objects. The reality, augmented reality, augmented virtuality and virtual reality technologies are mixed. MR is a composite mixed reality (MR) of virtual reality (VR) plus augmented reality (AR), which is an extension of virtual reality (VR) technology, and can increase the reality sense of user's experience by presenting a virtual scene in a real scene.

The MR field involves a computer vision. The computer vision is a science that studies how to make machines "see". Further, it refers to a machine vision that cameras and computers are used to replace human eyes to recognize, track and measure targets, and then images are processed by a computer to images which are more suitable for visual observation or transmission to instruments for detection.

Namely, MR is a simulated scenery integrating a sensory input created by computer (e.g., a virtual object) with a sensory input from a physical scenery or a representation thereof. In some MR sceneries, the sensory input created by computer can be adapted to a variation of the sensory input from the physical scenery. Additionally, some electronic systems used to present the MR scenery can monitor an orientation and/or position in relation to the physical scenery, so that the virtual object can interact with the real object (i.e., a physical element from the physical scenery or representation thereof). For example, the system can monitor a motion, so that a virtual plant appears stationary in relation to a physical building.

After introducing some concepts involved in the embodiments of the present disclosure, a method for calling applications provided in the embodiments of the present disclosure will be described below in detail with reference to the accompanying drawings. The same content refers to the description of the foregoing embodiments and will not be reiterated.

FIG. 1 is a flowchart of a method of calling applications provided in an embodiment of the present disclosure. The embodiments of the present disclosure can be adapted to a human-computer interaction scenario, and the method of calling applications can be executed by an apparatus of operating applications. The apparatus can comprise hardware and/or software, and can be integrated into an electronic device. In the embodiments of the present disclosure, the electronic device can be any hardware device that can provide an extended reality space. For example, the electronic device is an XR device, such as, a VR device, an AR device, a MR device, etc., which is not particularly limited in the present disclosure. Considering that the implementation principles of different types of electronic devices are same, for convenience of explanation, a detailed description will be made by taking the electronic device as VR device as an example in the following embodiments.

As shown in FIG. 1, the method of calling applications comprises the following steps:

S101. Displaying an application navigation interface in an extended reality space in response to a call-out instruction of the application navigation interface. The application navigation interface comprises application categories displayed in category and icons or thumbnails of applications contained in the application categories.

The embodiments of the present disclosure performs an operation of applications by an application navigation interface comprising application categories displayed in category and icons or thumbnails of applications contained in the application categories. By the application navigation interface, the applications can be opened, closed, or switched from the background to the foreground, etc.

In the embodiments of the present disclosure, the user can interact with the extended reality space by means of one or more of the following: a handheld device (such as, a handle or a hand controller), a gesture operation, a voice mode and a gaze control, which is not particularly limited in the embodiments of the present disclosure.

Correspondingly, the user can input a call-out instruction by any means as above. For example, the user long-presses a "trigger" button via the handle, and the VR device detects a long-press operation of the "trigger" button and accordingly generates a call-out instruction for the application navigation interface. As another example, the user speaks "AA, please open the application navigation", where AA is the voice wake-up word. As another example, the user makes a preset gesture, and the VR device detects the user's gesture and generates the call-out instruction for the application navigation interface upon the detection of the preset gesture.

The methods of the embodiments of the present disclosure can be specifically applied in the following scenarios:

In a first application scenario, the applications on the application navigation interface are opened application running in the background in the XR device.

In the extended reality space, the user can open a plurality of applications (referred as, app/apps). Usually, the number of applications running in the foreground is limited. For example, only one application can run in the foreground, and the other applications run in the background. Icons of the applications running in the background are displayed in the menu bar of the extended reality space (e.g., the dock bar), and the user switches the applications running in the background to the foreground by operating the icons of the applications in the menu bar. However, the application switching operated by the menu bar is more suitable for a 2D space, rather than a 3D space. Moreover, there are a large number of applications in the extended reality space. When the user opens a plurality of applications, or the same application has a plurality of windows, these windows may be collapsed in the menu bar, which is inconvenient for the user to operate.

Based on this, the embodiments of the present disclosure provide an application navigation interface. The applications running in the background and the application categories are quickly displayed to the user by the application navigation interface, thereby facilitating the user to operate the applications running in the background.

In the second application scenario, the applications on the application navigation interface are opened applications in the XR device. The opened applications comprise applications running in the foreground and applications running in the background.

Optionally, the applications running in the foreground and the applications running in the background are displayed differently to facilitate the user to quickly understand the status of the applications. For example, the icon or thumbnail of an application running in the foreground is highlighted, and the icon or thumbnail of an application running in the background is displayed normally. Alternatively, the icons or thumbnails of the applications running in the foreground and the application running in the background are displayed in different colors.

The thumbnail of application is for the opened application, and the window of the opened application is displayed in the navigation window in form of thumbnail. Of course, the opened application can also be displayed in the navigation window in form of the icon of application.

The thumbnail can comprise a part of content in the application window. The content displayed in the thumbnail is usually a simplified version of the content in the application window, which can be literal content (that can be a title of the content in the application window), or an image.

In the third application scenario, the applications on the application navigation interface comprise opened applications and unopened applications in the XR device.

Optionally, the opened applications and the unopened applications are displayed differently to facilitate the user to understand the status of the applications. For example, the icon or thumbnail of the opened application is highlighted, and the icon or thumbnail of the unopened application is displayed normally.

The unopened applications do not have window thumbnails. In one implementation, an application thumbnail is displayed for an opened application in the application navigation interface, and an application icon is displayed for an unopened application in the application navigation interface. Therefore, the user can distinguish the opened application from the unopened application from the difference between the icon and the thumbnail of the application.

In the embodiments of the present disclosure, all of the applications on the application navigation interface are displayed in category. The application category comprises, but not limited to, one or more of the following: a browser, a game, a video, a music, shopping, instant messaging, a utility tool, life, uncategorized, etc.

For example, the navigation interface comprises a navigation line. Category marks are displayed on the navigation line at intervals. The icons or thumbnails of the applications contained in each of the application categories are displayed in a row on a side of a corresponding category mark.

FIG. 2 is a schematic diagram of the application navigation interface. As shown in FIG. 2, dots on the navigation line represent the category marks. The icons or thumbnails of the applications contained in each of the application categories are displayed in a row above the corresponding category marks, and the category names are displayed below the category mark. The category names and the dots on the navigation line can also be commonly understood as the category mark.

Optionally, the icons or thumbnails of the applications contained in each of the application categories can also be displayed in a row on both sides of the category mark.

FIG. 3 is another schematic diagram of the application navigation interface. As shown in FIG. 3, there is no navigation line in the application navigation interface. Each of the application categories corresponds to a category box, and the category name is displayed below the category box. The icons or thumbnails of the applications contained in each of the application categories are displayed in a row in the corresponding category box.

In this embodiment, the categories of applications can be obtained by two ways: the first is that the categories of applications in the XR device are automatically classified by the XR device, that is, the categories of applications have been classified upon the device leaving the factory, and the second is that the categories of applications in the XR device are configured by the user. The third way is that the applications in the XR device comprise system-built-in applications and third-party applications, and the categories of the system-built-in applications can be automatically classified by the XR device, and the categories of the third-party applications are configured by the user.

As an example, a category configuration entry can be set. The user opens a configuration interface by the category configuration entry to configure the categories of applications in the XR device.

In an exemplary manner, the user creates folders for different categories, and drags applications in application category into the respective folders. The category of the folder is the application category.

It should be noted that an opened application may have a plurality of windows. For example, for office applications, the user can open a plurality of different word windows at the same time, and correspondingly a plurality of thumbnails of the word windows will be displayed in the navigation window, that is, each MS Word window corresponds to a thumbnail.

S102. Displaying a window of a first target application selected by a selection instruction of a first target object in the extended reality space in response to the selection instruction in the application navigation interface. The selection instruction is used to select applications corresponding to an application category or select an application.

When the selection instruction is used to select an application category, all the applications corresponding to the selected target application category are displayed in the extended reality space. At that time, all the applications corresponding to the target application category are the first target applications.

By selecting an application category, all the applications in the application category can be quickly opened, or quickly switched to the foreground.

For the application navigation interface shown in FIG. 2, the user can perform a selection operation on the category marks above the navigation line or the category names below the navigation line to select an application category. At that time, the category mark or category name is the first target object. The selection operation can be a click operation, a double-click operation, or a long-press operation on the category marks or category names.

Figure 4:
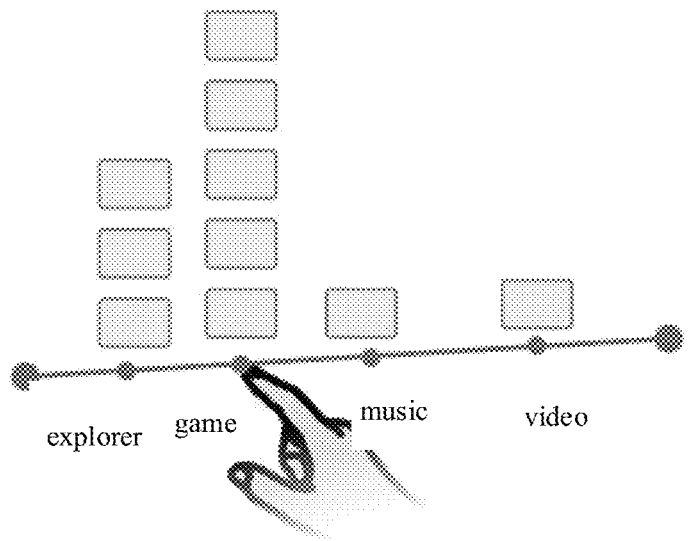
FIG. 4 is a schematic diagram for selecting an application category.

FIG. 4 is a schematic diagram of selecting an application category. As shown in FIG. 4, the user controls the virtual hand to click on the category mark of the game category to select the game category. Optionally, the virtual hand can also be replaced with a cursor. In some VR devices, the interaction is performed by a ray. Correspondingly, the virtual hand can also be replaced with a ray. When the endpoint of the ray is located on the category mark of the game category, the game category is selected.

For the application navigation interface shown in FIG. 3, the user can perform a selection operation on the category box or category name to select an application category. The selection operation can be a click operation, a double-click operation or a long-press operation on the category box or category name, and can also be a hover operation on the category box.

When the selection instruction is used to select an application, the first target object is the icon or thumbnail of the first target application, and the selection instruction can be a click operation, a double-click operation or a long-press operation on the icon or thumbnail of the first target application.

Figure 5:
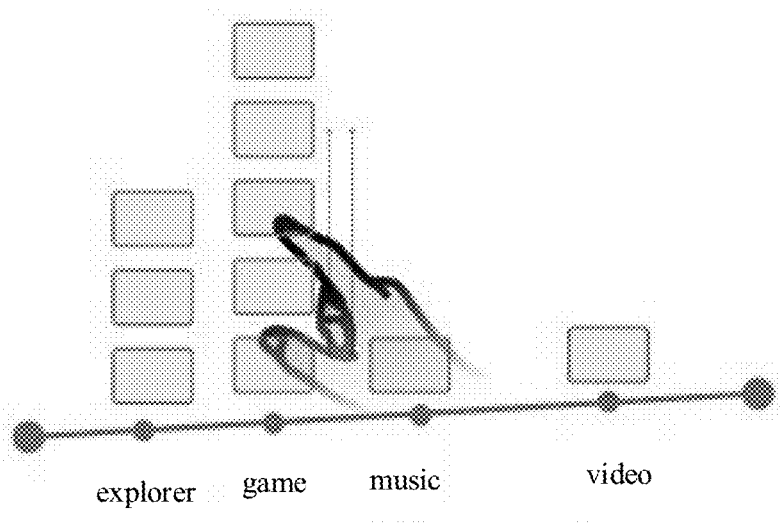
FIG. 5 is a schematic diagram for selecting an application.

FIG. 5 is a schematic diagram of selecting an application. As shown in FIG. 5, there is a total of 5 application icons and/or thumbnails in the game category. The user controls the virtual hand to click on the third application thumbnail in the game category to select the third application thumbnail. Optionally, the virtual hand can also be replaced with a cursor or ray.

In this embodiment, when the first target application is an unopened application, the first target application is started in response to the selection command, and the window of the first target application is displayed in the extended reality space. When the first target application is an opened application running in the background, the first target application is switched to the foreground in response to the selection command. When the first target application is an opened application running in the foreground, no operation is performed in response to the selection command.

When a plurality of windows of the application are displayed in the extended reality space, in a display mode, the plurality of windows of the application can be arranged to form M rows and N columns. Both M and N are positive integers, at least one of M and N is greater than 1, and the different values of M and N enable the horizontal and the vertical directions to display the windows. For example, a total of 6 windows are displayed in the virtual reality space, which are displayed in 2 rows and 3 columns.

Figure 6:
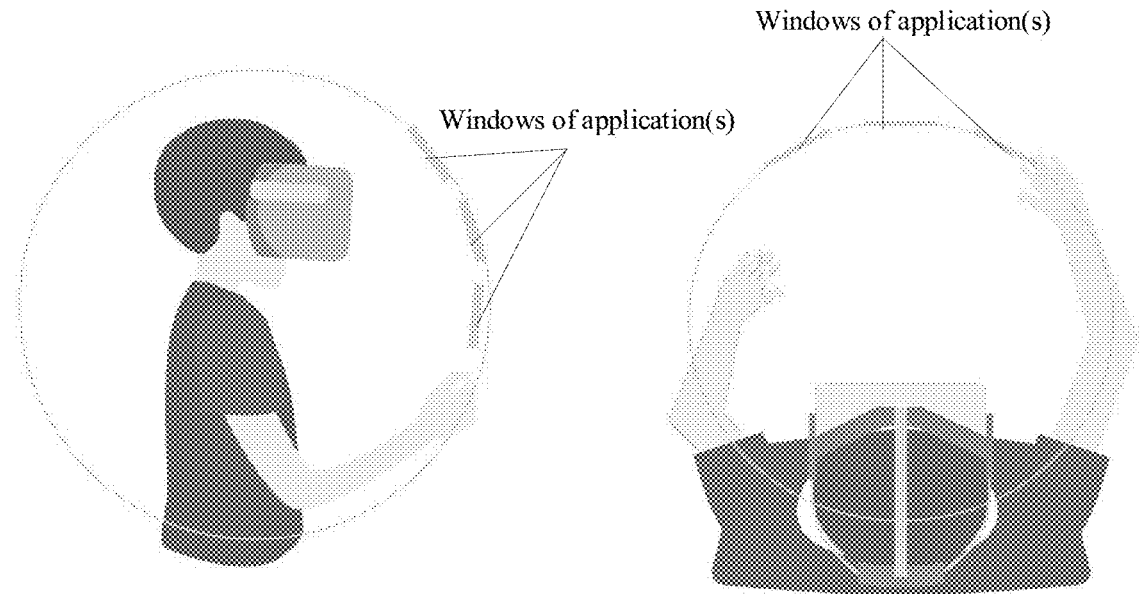
FIG. 6 is a schematic diagram for displaying windows of applications in an extended real space.

Referring to FIG. 6, in an XR device, taking the user as the center, the extended reality space can be a spherical space. With the user's movement or rotation, the user's visual viewing angle varies so that the entire spherical space can be seen. In the extended reality space shown in FIG. 6, 3 respective windows are displayed in the horizontal and the vertical directions.

In another display mode, the plurality of windows of the application(s) can be arranged in a row and tiled in a 360-degree circle around the user. When the plurality of windows of the application(s) surround to form a circle, the user can see the application windows therebehind by turning around.

In this embodiment, the application navigation interface is displayed in the extended reality space in response to a call-out instruction of the application navigation interface. The application navigation interface comprises applications categories displayed in category and icons or thumbnails of the applications contained in the application categories, and the window of the first target application selected by the selection instruction of the first target object in the extended reality space is displayed in response to the selection instruction in the application navigation interface. The selection instruction is used to select applications corresponding to an application category or select an application. By displaying the applications in category on the application navigation interface, it is possible to select a category of applications at one time, open a category of applications at the same time, or switch a category of applications to the foreground, which facilitates the user to call the applications and improves the user's experience.

On the basis of the above embodiment, another embodiment 2 of the present disclosure provides a method of calling applications for describing the call-out process of the application navigation interface in detail. The same content refers to the description of the previous embodiment, which is not reiterated in this embodiment.

FIG. 7 is a flowchart of the method of calling applications provided in another embodiment of the present disclosure. As shown in FIG. 7, the method provided in this embodiment comprises the following steps.

S201. Displaying a first control in a palm of a hand corresponding to a first gesture in response to a detection of the first gesture matching a first preset gesture.

The first gesture can be either a physical gesture or a virtual gesture. The physical gesture can be understood as a gesture made by the user in the real environment, and the virtual gesture refers to a gesture displayed on the display screen of the XR device, or it can be understood as a gesture displayed in virtual reality space. The virtual gesture is usually to simulate the user's gesture in the real environment, which gives the user an immersive experience.

When the first gesture is a virtual gesture, the user can call out the first gesture by means of a gesture, a voice, a handheld device control or a gaze control, etc.

When the user interact with the XR device by means of a gesture, the user will make a corresponding gesture in the real environment. The XR device recognizes the user's gesture in the real environment by a gesture recognition method, and matches the recognized gesture with a preset gesture. If the recognized gesture matches the preset gesture, a preset operation is performed. The preset operation is, e.g., to display the recognized gesture.

For example, the first gesture is left palm upward, and the first control is a circular or spherical control displayed in the left palm.

S202. Selecting the first control in response to a detection of a second gesture matching a second preset gesture.

The second gesture can be either a physical gesture or a virtual gesture, which is different from the first gesture.

In an exemplary manner, the second gesture is a pinched posture of fingers. The pinched posture is, for example, a pinching of the forefinger with the thumb, or a pinching of the thumb with other fingers, which is not limited in this embodiment. The pinched posture is used to pinch the first control, and when the first control is pinched by the second gesture, the first control is selected.

In another exemplary manner, the second gesture is a posture of the finger pressing the first control. The first control can be pressed by the forefinger, or can be pressed by another finger. When the first control is pressed through the second gesture, the first control is selected.

Optionally, a first notice information is further displayed around the first gesture, which is used to notice the user to perform a pinching or sliding operation on the first control. The notice information can be displayed in literal or graphical mode. For example, an arrow is displayed to notice the second gesture to move outward.

S203. Forming a navigation line and an application navigation interface in response to an outward movement operation starting from the position of the first control with maintaining the second gesture.

The navigation interface generated in this embodiment comprises a navigation line. Category marks are displayed on the navigation line at intervals, and the icons or thumbnails of the applications contained in each of the application categories are displayed in a row on a side of a corresponding category mark. Please refer to the navigation interface shown in FIG. 2.

When the second gesture is a pinched posture of fingers, the fingers in the pinched posture moves outward starting from the first control to form the navigation line and the application navigation interface.

When the second gesture is a posture of the finger pressing the first control, the finger moves outward with pressing the first control. The second gesture can be understood as a finger sliding operation, that is, the finger presses the first control and slides outward from the first control to form the navigation line and the application navigation interface.

Figure 8:
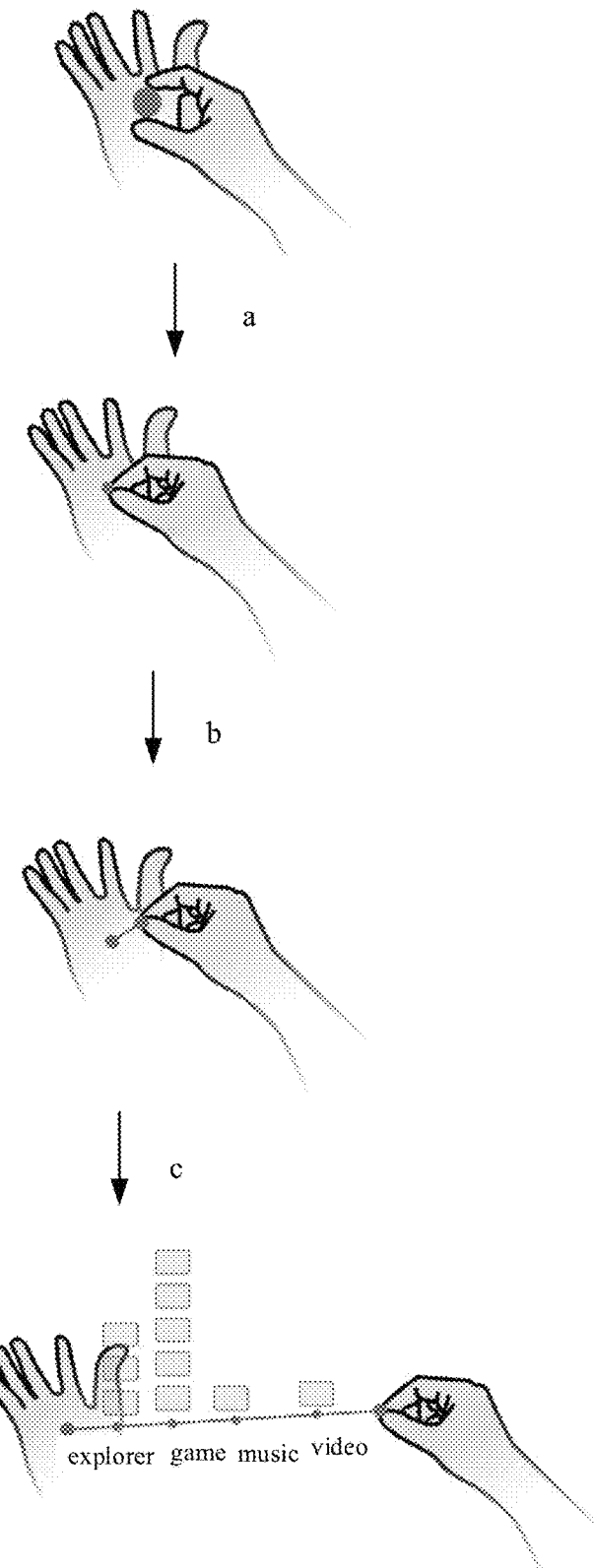
FIG. 8 is a schematic diagram of a process of generating an application navigation interface.

FIG. 8 is a schematic diagram of a process of generating an application navigation interface. As shown in FIG. 8, the first gesture is left palm upward. When the first gesture matching the first preset gesture is detected, an image corresponding to the left hand in the interface shown in FIG. 8(a) is displayed, that is, a circular first control is displayed in the left palm.

The second gesture is a pinched posture of fingers. Referring to the image corresponding to the right hand in the interface shown in FIG. 8(a), when the first control is pinched by fingers, that is, when the second gesture is in the state shown in FIG. 8(b), the first control is selected.

After the first control is selected, when the operation of moving outward from the position of the first control with maintaining the second gesture is detected, the navigation line (refer to the interface shown in FIG. 8(c)) and the application navigation interface (refer to FIG. 8(d)) are formed. FIG. 8(c) is a schematic diagram of the movement operation of the second gesture. The movement operation shown in FIG. 8(c) is similar to an effect of pulling out the navigation line outward, thereby giving the user an immersive experience.

FIG. 8(d) is a schematic diagram of the application navigation interface at the end of the movement operation. Optionally, during the movement of the second gesture, the navigation line and the application navigation interface can be gradually displayed, that is, as the user's movement distance increases, the navigation line and the application navigation interface is gradually displayed.

Optionally, after the interface shown in FIG. 8(d) is displayed for a preset period (for example, 200 ms), the first gesture and the second gesture can end. When the first and the second gestures are physical gestures, the user can put his/her hands down. When the first and the second gestures are virtual gestures, they can be hidden, and then cannot be seen by the user.

S204. Displaying a window of a first target application selected by a selection instruction of a first target object in the extended reality space in response to the selection instruction in the application navigation interface. The selection instruction is used to select applications corresponding to an application category or select an application.

In this embodiment, the first control is displayed in the palm of the hand corresponding to the first gesture in response to the detection of the first gesture matching the first preset gesture; the first control is selected in response to the detection of the second gesture matching the second preset gesture; and the navigation line and the application navigation interface are formed in response to the outward movement operation starting from the position of the first control with maintaining the second gesture. The moving trail of the second gesture form the navigation line, and the application navigation interface is called out by the gesture, giving the user a better immersive experience.

On the basis of the aforesaid embodiments, another embodiment of the present disclosure provides a method of calling applications for describing the closing of applications on the application navigation interface in detail. The same content refers to the description of the previous embodiments, which is not reiterated in this embodiment. FIG. 9 is a flowchart of the method of calling applications provided in another embodiment of the present disclosure. As shown in FIG. 9, the method provided in this embodiment comprises the following steps.

S301. Displaying an application navigation interface in an extended reality space in response to a call-out instruction of the application navigation interface. The application navigation interface comprises application categories displayed in category and icons or thumbnails of applications contained in the application categories.

S302. Displaying a window of a first target application selected by a selection instruction of a first target object in the extended reality space in response to the selection instruction in the application navigation interface. The selection instruction is used to select applications corresponding to an application category or select an application.

Optionally, in this embodiment, the number of windows that can be displayed in the extended reality space is limited. Correspondingly, when the selection instruction is detected, it is judged if a sum of the number of the first target applications and the number of the displayed applications in the extended reality space is greater than a threshold of the number of windows that can be displayed in the extended reality space. For example, the threshold of the number of windows that can be displayed in the extended reality space is 6, 8 or 9.

When the sum is not greater than (that is, less than or equal to) the threshold of the number of windows that can be displayed in the extended reality space, the window of the first target application is displayed in the extended reality space.

When the sum is greater than the threshold of the number of windows that can be displayed in the extended reality space, in an implementation, the windows of a part of applications displayed applications in the extended reality space are closed, and the windows of the first target applications are displayed in the extended reality space.

For example, the windows of applications that are not usually used by the user are closed as priority, or the windows of the earliest opened application are closed as priority in the order of opening the windows of applications.

In another implementation, when the sum is greater than the threshold of the number of windows that can be displayed in the extended reality space, a notice information is displayed. The notice information is used to notice the user that the number of the selected windows is greater than the threshold of the number of the windows that can be displayed in the extended reality space.

Based on the notice information, the user can close the windows of a part of applications displayed applications in the extended reality space, or re-select the applications on the application navigation page so that the windows of the selected first target applications can be displayed.

Optionally, a first confirmation information is displayed while displaying the notice information. The first confirmation information is used to confirm whether to continue to display the windows of the first target applications. If the user selects "Yes", the XR device will automatically close the windows of some displayed applications in the extended reality space, and display the windows of the first target applications. If the user selects "No", the windows of the first target applications will not be displayed, or only some windows will be displayed. For example, the user has selected a total of 5 windows for display, while the extended reality space can currently display only 3 windows, then the XR device selects 3 windows for display, and the remaining two windows are not displayed.

S303. Closing a second target application corresponding to a second closing instruction of a second target object in response to the second closing instruction in the application navigation interface. The second closing instruction is used to close applications corresponding to one application category or close one application.

When the second closing instruction is used to close an application category, all applications corresponding to the selected target application category are closed in the extended reality space. At that time, all the applications corresponding to the target application category are the second target applications.

For the application navigation interface shown in FIG. 2, the user can perform a click operation, a double-click operation or a long-press operation on the category mark above the navigation line or the category name below the navigation line to close the application category. At that time, the category mark or category name is the second target object.

For the application navigation interface shown in FIG. 3, the user can perform a click operation, a double-click operation, or a long-press operation on the category box or the category name to close the application category.

It should be noted that the operations for displaying or closing an application category in the application navigation page are not limited in this embodiment, provided that they are different. For example, the user displays the windows of all the applications in the application category corresponding to a category mark by clicking the category mark, and the user closes the windows of all the applications in the application category corresponding to the category mark by long-pressing the category mark. On the contrary, the user displays the windows of all the applications in the application category corresponding to the category mark by long-pressing a category mark, and closing the windows of all the applications in the application category corresponding to the category mark by clicking on a category mark. Similarly, the two operations can also be performed by the click operation and the double-click operation, or by the double-click operation and the long-press operation.

When the second closing instruction is used to close an application, the second target object is the icon or thumbnail of the second target application. The second closing instruction can be the click operation, the double-click operation or the long-press operation on the icon or thumbnail of the second target application.

It should be noted that the operations for displaying or closing an application in the application navigation page are not limited in this embodiment, provided that they are different. For example, the user displays the windows of the application by clicking on an application thumbnail, and closes the windows of the application by long-pressing an application thumbnail. On the contrary, the user displays the windows of the applications by long-pressing an application thumbnail, and closes the windows of the applications by clicking on an application thumbnail. Similarly, the two functions can also be performed by the click operation and the double-click operation, or by the double-click operation and the long-press operation.

The method of this embodiment achieves quick closing of a category of application by the application navigation interface. In the existing technology, when a user needs to close an opened application, he/she needs to select the window of the application in the menu bar and then click on the close control in the window to close the window of the application, or switch the window of the application to run in the foreground and then click on the close control in the window to close the application window. For a plurality of windows of the same category of applications, the above operations have to be repeated multiple times to close the windows. In the method of this embodiment, it only needs to perform one operation on the application category on the application navigation interface to close the plurality of application windows in the application category. The operation is simple and has a high closing efficiency.

It should be noted that the steps S302 and S303 can be executed in any order, provided that corresponding operations are triggered in accordance with the user's demand.

S304. Closing the application navigation interface in response to a first closing instruction of the application navigation interface.

The first closing instruction is used to close the application navigation interface. In this embodiment, the first closing instruction can be input by the user by means of a voice, a handheld device, or a gesture, etc.

In an implementation, the endpoint of the navigation line is selected in response to a detection of a third gesture matching a third preset gesture; and the application navigation interface is closed in response to a movement operation from the endpoint of the navigation line to the starting point of the navigation line with maintaining the third gesture.

For example, the third gesture is the same as the second gesture, that is, the third gesture is a pinched posture of fingers, or a posture of the finger pressing the endpoint of the navigation line.

The pinched posture of fingers as the third gesture is illustrated as an example. when it is detected that the endpoint of the navigation line is pinched in the pinched posture, the endpoint of the navigation line is selected. Then, the pinched posture is maintained to move from the endpoint of the navigation line to the starting point. When the starting point of the navigation line is reached, the application navigation interface is closed.

Optionally, in response to the detection of the third gesture matching the third preset gesture, before selecting the endpoint of the navigation line, the starting point of the navigation line is moved to a palm of a hand corresponding to a fourth gesture in response to a detection of the fourth gesture matching a fourth preset gesture.

For example, the fourth gesture is the same as the first gesture. When the fourth gesture is the same as the first gesture shown in FIG. 8, that is, when detecting a gesture of palm upward, the starting point of the navigation line is moved to the palm of the hand corresponding to the fourth gesture.

Optionally, the first closing instruction is a hover operation on the application navigation interface. Hover usually means a state of the cursor hovering over a certain element. Hover can be used to highlight a notice, explain an information floating box, or a lower-level navigation, etc. After hover, the status of some buttons will vary. Typically, a button box or highlight appears to allow the user to notice this function and understand that the cursor has entered a clickable area of the function. Especially, for the text that does have sufficiently strong clicky feel, hover can tell the user that it is operable.

This embodiment utilizes the hover function to close the application navigation interface. For example, when it is detected that the cursor moves into the application navigation interface and the hovering period is equal to a first period, the application navigation interface is closed.

It can be understood that the closing method of the application navigation interface is not limited to that in step S304, and the application navigation interface can also be closed by other ways.

In a closing method, the application navigation interface is automatically closed after being displayed for a preset period of time. For example, the application navigation interface is automatically closed 2 seconds after it is called out.

In another closing method, the application navigation interface is closed after the window of the first target application is displayed. Alternatively, it can be understood that the user closes the application navigation interface after selecting the window of the first target application. For example, after the user selects an application category, the windows of the applications corresponding to the selected application category are displayed in the extended reality space, while the application navigation interface is closed. In this method, if the user needs to select other applications, he/she needs to call out the application navigation interface again.

In this embodiment, a second target application corresponding to a second closing instruction of a second target object is closed in response to the second closing instruction in the application navigation interface. The second closing instruction is used to close an application corresponding to an application category or an application. This method only requires one operation on the application category on the application navigation interface to close a plurality of windows of the application in the application category. The operation is simple and has high closing efficiency. Further, the application navigation interface is closed in response to the first closing instruction of the application navigation interface, which can close the application navigation interface according to user operations, thereby avoiding blocking other applications by the application navigation interface.

To order to perform the application calling method in the embodiments of the present disclosure better, the embodiments of the present disclosure further provide an apparatus of calling applications. FIG. 10 is a structural schematic diagram of an apparatus of calling applications provided in another embodiment of the present disclosure. As shown in FIG. 10, the apparatus of calling the applications can comprise: a displaying module 11, configured to display an application navigation interface in an extended reality space in response to a call-out instruction of the application navigation interface, the application navigation interface comprising application categories displayed in category and icons or thumbnails of applications contained in the application categories; and a calling module 12, configured to display a window of a first target application selected by a selection instruction of a first target object in the extended reality space in response to the selection instruction in the application navigation interface, the selection instruction being configured to select applications corresponding to an application category or select an application.

In some embodiments, the navigation interface comprises a navigation line. Category marks are displayed on the navigation line at intervals, and the icons or thumbnails of the applications contained in each of the application categories are displayed in a row on a side of a corresponding category mark.

In some embodiments, the displaying module 11 is specifically configured to: display a first control in a palm of a hand corresponding to a first gesture in response to a detection of the first gesture matching a first preset gesture; select a first control in response to a detection of a second gesture matching a second preset gesture; and form the navigation line and the application navigation interface in response to an outward movement operation starting from the position of the first control with maintaining the second gesture.

In some embodiments, the second gesture is a pinched posture of fingers, or the second gesture is a posture of finger pressing the first control.

In some embodiments, the application navigation interface is automatically closed after being displayed for a preset period of time.

In some embodiments, it further comprises a closing module configured to close the application navigation interface after the window of the first target application is closed.

In some embodiments, it further comprises a closing module configured to close the application navigation interface in response to a first closing instruction of the application navigation interface.

In some embodiments, the closing module is specifically configured to: select an endpoint of the navigation line in response to a detection of a third gesture matching a third preset gesture; and close the application navigation interface in response to a movement operation of moving from the endpoint of the navigation line to the starting point of the navigation line with maintaining the third gesture.

In some embodiments, the applications on the application navigation interface are opened applications in the reality XR device.

In some embodiments, the calling module 12 is further configured to: close a second target application corresponding to a second closing instruction of a second target object in response to a second closing instruction in the application navigation interface. The second closing instruction is used to close applications corresponding to one application category or close one application.

In some embodiments, the opened applications comprise applications running in the foreground and applications running in the background, and the applications running in the foreground and the applications running in the background are displayed differently.

In some embodiments, the selection instruction is a click operation on the application category or application; and the first closing instruction is a long-press operation on an application category or an application.

In some embodiments, the applications on the application navigation interface comprise opened applications and unopened applications in the extended reality XR device and the opened applications and the unopened applications are displayed differently. Correspondingly, the calling module 12 is specifically configured to: when the first target application is an unopened application, starting the first target application in response to the selection command, and display the window of the first target application in the extended reality space; and when the first target application is an opened application running in the background, switch the first target application to run in the foreground in response to the selection command.

In some embodiments, the categories of applications are automatically classified by the extended reality XR device.

In some embodiments, the categories of the applications are configured by the user.

In some embodiments, the selection instruction is any one of the following operations on the application categories or applications selected from the group consisting of: a click operation, a double-click operation or a long-press operation.

In some embodiments, when a plurality of windows of the application are displayed in the extended reality space, the plurality of windows of the application are arranged to form M rows and N columns. Both M and N are positive integers, and at least one of M and N is greater than 1.

In some embodiments, the calling module 12 is specifically configured to: when a sum of a number of the first target applications and a number of the applications displayed in the extended reality space is less than or equal to a threshold of a number of windows that can be displayed in the extended reality space, display the window of the first target application in the extended reality space; when the sum of the number of the first target applications and the number of the applications displayed in the extended reality space is greater than the threshold of the number of windows that can be displayed in the extended reality space, close the windows of a part of the applications displayed in the extended reality space, and display the window of the first target application in the extended reality space; or when the sum of the number of the first target applications and the number of applications displayed in the extended reality space is greater than the threshold of the number of windows that can be displayed in the extended reality space, display a notice information used to notice a user that a number of selected windows is greater than the threshold of the number of the windows that can be displayed in the extended reality space.

It should be understood that apparatus embodiments and method embodiments can correspond to each other, and similar descriptions can refer to method embodiments. To avoid repetition, it will not be reiterated it here.

The apparatus 100 of the embodiments of the present disclosure is described from the perspective of functional modules in conjunction with the accompanying drawings. It should be understood that the functional modules can be implemented by hardware, software instructions, or a combination of hardware and software modules. Specifically, the steps of the method embodiments in the present disclosure can be completed by integrated logic circuits of hardware and/or software instructions in the processor. The steps of the method disclosed in the present disclosure embodiment can be directly embodied in the execution by the hardware decoding processor or the combination of hardware and software modules in the decoding processor. Optionally, software modules can be located in mature storage media in the field, such as random access memory, flash memory, read-only memory, programmable read-only memory, electrically erasable programmable memory, registers, etc. The storage medium is located in the memory, and the processor reads the information in the memory and executes the steps in the above method embodiment in combination with its hardware.

Figure 11:
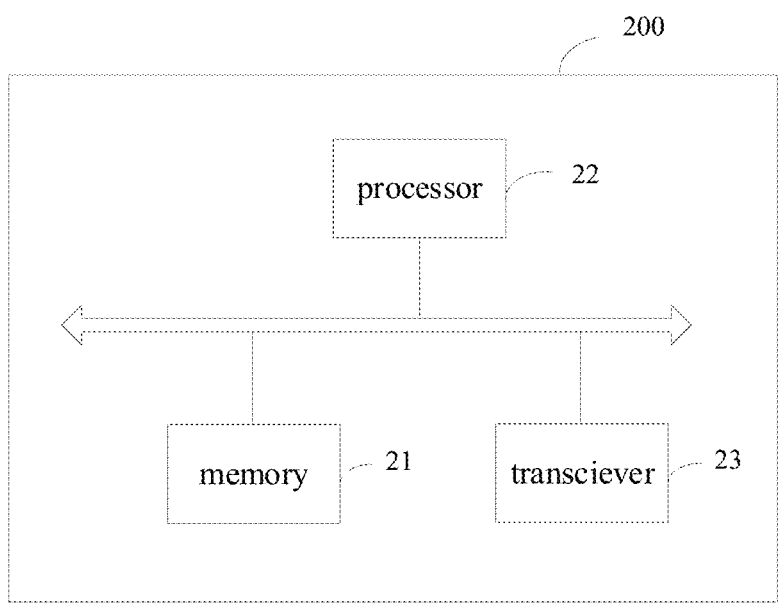
FIG. 11 is a structural schematic diagram of an electronic device provided in another embodiment of the present disclosure.

The embodiment of the present disclosure also provides an electronic device. FIG. 11 is a structural schematic diagram of the electronic device provided in another embodiment of the present disclosure. As shown in FIG. 11. the electronic device 200 can comprises: a memory 21 and at least one processor 22. The memory is configured to store computer programs and transmit the program code to the processor 22. In other words, the processor 22 can call and run a computer program from the memory 21 to implement the methods in the embodiments of the present disclosure.

For example, the processor 22 can be configured to execute the above method embodiments based on instructions in the computer program.

In some embodiments of the present disclosure, the processor 22 can comprise, but is not limited to: a general purpose processor, Digital Signal Processors (DSP), an Application Specific Integrated Circuit (ASIC), a Field Programmable Gate Array (FPGA) or another programmable logic device, a discrete gate or transistor logic device, a discrete hardware component, etc.

In some embodiments of the present disclosure, the memory 21 comprises but is not limited to: volatile memory and/or non-volatile memory. Non-volatile memory can be a read-only memory (ROM), a programmable read-only memory (PROM), an erasable programmable read-only memory (EPROM), an electrically erasable programmable a read-only memory (EEPROM), or a flash memory. The volatile memory can be a Random Access Memory (RAM), which serves as an external cache. By way of example but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an Enhanced Synchronous Dynamic Random Access Memory (ESDRAM), a Synchronous Link DRAM (SLDRAM), and a Direct Rambus RAM (DR RAM).

In some embodiments of the present disclosure, the computer program can be divided into one or more modules, which are stored in the memory 21 and executed by the processor 22 to complete the methods provided in the present disclosure. The one or more modules can be a series of computer program instruction segments capable of completing specific functions, which are used to describe the execution process of the computer program in electronic device.

As shown in FIG. 11, the electronic device can also comprise a transceiver 23, which can be connected to the processor 22 or memory 21.

Processor 22 can control the transceiver 23 to communicate with other devices, specifically, to send information or data to or receive information or data sent by other devices. Transceiver 23 can comprise a transmitter and a receiver. Transceiver 23 can further comprise antennas, and the number of antennas can be one or more.

It can be understood that although not shown in FIG. 11, the electronic device 200 can also comprises a camera module, a wireless fidelity WIFI module, a positioning module, a Bluetooth module, a display, and a controller, etc., which will not be further described here.

It should be understood that various components of the electronic device are connected through a bus system, which comprises a power bus, a control bus, and a status signal bus in addition to a data bus.

The present disclosure also provides a computer storage medium. A computer program is stored on the computer storage medium. The computer program enables the computer to execute the method embodiments mentioned above when executed by the computer. Alternatively, the embodiment of the present disclosure also provides a computer program product containing instructions. The instructions cause the computer to execute the method embodiment mentioned above when executed by a computer.

The present disclosure also provides a computer program product, which comprises a computer program stored on a computer readable storage medium. The processor of the electronic device reads the computer program from the computer readable storage medium, and the processor executes the computer program, causing the electronic device to execute the corresponding process of the control method of the user position in the virtual scene in the embodiment of the present disclosure. For simplicity, it will not be repeated here.

In the several embodiments provided by the present disclosure, it should be understood that the disclosed system, apparatus, and method can be implemented in other ways. For example, the apparatus embodiments mentioned above are only illustrated as an example. For example, the division of the module is only a logical functional division, and there can be other division in practical implementation. For example, a plurality of modules or components can be combined or integrated into another system, or some features can be ignored or not executed. On the other hand, the coupling or direct coupling or communication connection shown or discussed between each other can be indirect coupling or communication connection through some interfaces, devices or modules, which can be electrical, mechanical or other forms.

The modules described as separate components can be or can not be physically separated, while the components shown as modules can be or can not be physical modules, which can be located in one place or distributed across multiple network units. Some or all modules can be selected according to actual needs to achieve the purpose of the embodiments. For example, respective functional modules of various embodiments of the present disclosure can be integrated into one processing module, respective modules can physically exist separately, or two or more modules can be integrated into one module.

The above is just the specific implementation of the present disclosure, but the scope of protection of the present disclosure is not limited to this. Those skilled in the art can easily think of changes or replacements within the scope of technology disclosed in the present disclosure which should be covered within the scope of protection of the present disclosure. Therefore, the protection scope of the present disclosure should be based on the protection scope of the claims.

What is claimed is:

1. A method of calling applications, comprising:
   displaying an application navigation interface in an extended reality space in response to a call-out instruction of the application navigation interface, wherein the application navigation interface comprises application categories displayed in category and icons or thumbnails of applications contained in the application categories; and
   displaying a window of a first target application selected by a selection instruction of a first target object in the extended reality space in response to the selection instruction in the application navigation interface, wherein the selection instruction is used to select applications corresponding to an application category or select an application,
   wherein when windows of a plurality of applications are displayed in the extended reality space, the windows of the plurality of applications are arranged to form M rows and N columns, wherein both M and N are positive integers, and at least one of M and N is greater than 1.

2. The method according to claim 1, wherein the application navigation interface comprises a navigation line on which category marks are displayed at intervals, and icons or thumbnails of applications contained in each of the application categories are displayed in a row on a side of a corresponding category mark.

3. The method according to claim 2, wherein the displaying the application navigation interface in the extended reality space in response to the call-out instruction of the application navigation interface comprises:
   displaying a first control in a palm of a hand corresponding to a first gesture matching a first preset gesture in response to a detection of the first gesture;
   selecting the first control in response to a detection of a second gesture matching a second preset gesture; and
   forming the navigation line and the application navigation interface in response to an outward movement operation starting from a position of the first control with maintaining the second gesture.

4. The method according to claim 3, wherein the second gesture is a pinched posture of fingers, or the second gesture is a posture of finger pressing the first control.

5. The method according to claim 1, further comprising:
   automatically closing the application navigation interface after displaying the application navigation interface for a preset period of time; or
   closing the application navigation interface after displaying the window of the first target application; or closing the application navigation interface in response to a first closing instruction of the application navigation interface.

6. The method according to claim 5, wherein the closing the application navigation interface in response to the first closing instruction of the application navigation interface comprises:

selecting an endpoint of the navigation line in response to a detection of a third gesture matching a third preset gesture; and closing the application navigation interface in response to a movement operation of moving from the endpoint of the navigation line to a starting point of the navigation line with maintaining the third gesture.

7. The method according to claim 1, wherein the applications on the application navigation interface are opened applications in an extended reality XR device.

8. The method according to claim 7, further comprising:

closing a second target application corresponding to a second closing instruction of a second target object in response to the second closing instruction in the application navigation interface, wherein the second closing instruction is used to close applications corresponding to one application category or close one application.

9. The method according to claim 7, wherein the opened applications comprise applications running in a foreground and applications running in a background, and the applications running in the foreground and the applications running in the background are displayed differently.

10. The method according to claim 5, wherein the selection instruction is a click operation of the application category or the application; and the first closing instruction is a long-press operation on the application category or the application.

11. The method according to claim 9, wherein the applications on the application navigation interface comprise opened applications and unopened applications in the extended reality XR device, and the opened applications and the unopened applications are displayed differently;

the displaying the window of the first target application selected by the selection instruction of the first target object in the extended reality space in response to the selection instruction in the application navigation interface comprises:

when the first target application is an unopened application, starting the first target application in response to a selection command, and displaying the window of the first target application in the extended reality space; and when the first target application is an opened application running in the background, switching the first target application to run in the foreground in response to the selection command.

12. The method according to claim 1, wherein the categories of the applications are automatically classified by an extended reality XR device; or the categories of the applications are set by a user.

13. The method according to claim 1, wherein the selection instruction is any one operation of the application categories or applications selected from the group consisting of: a click operation, a double-click operation or a long-press operation.

14. The method according to claim 1, wherein the displaying the window of the first target application selected by the selection instruction of the first target object in the extended reality space in response to the selection instruction in the application navigation interface comprises:

when a sum of a number of the first target applications and a number of the applications displayed in the extended reality space is less than or equal to a threshold of a number of windows that can be displayed in the extended reality space, displaying the window of the first target application in the extended reality space;

when the sum of the number of the first target applications and the number of the applications displayed in the extended reality space is greater than the threshold of the number of windows that can be displayed in the extended reality space, closing the windows of a part of applications displayed in the extended reality space, and displaying the window of the first target application in the extended reality space; or when the sum of the number of the first target applications and the number of applications displayed in the extended reality space is greater than the threshold of the number of windows that can be displayed in the extended reality space, displaying a notice information configured to notice a user that a number of selected windows is greater than the threshold of the number of the windows that can be displayed in the extended reality space.

15. An electronic device, comprising:

at least one processor and a memory, wherein the memory is configured to store a computer program, and the computer program upon execution by the at least one processor causes the at least one processor to perform operations, and the operations comprise:

displaying an application navigation interface in an extended reality space in response to a call-out instruction of the application navigation interface, wherein the application navigation interface comprises application categories displayed in category and icons or thumbnails of applications contained in the application categories; and displaying a window of a first target application selected by a selection instruction of a first target object in the extended reality space in response to the selection instruction in the application navigation interface, wherein the selection instruction is used to select applications corresponding to an application category or select an application, wherein when windows of a plurality of applications are displayed in the extended reality space, the windows of the plurality of applications are arranged to form M rows and N columns, wherein both M and N are positive integers, and at least one of M and N is greater than 1.

16. The electronic device according to claim 15, wherein the application navigation interface comprises a navigation line on which category marks are displayed at intervals, and icons or thumbnails of applications contained in each of the application categories are displayed in a row on a side of a corresponding category mark.

17. The electronic device according to claim 16, wherein the displaying the application navigation interface in the extended reality space in response to the call-out instruction of the application navigation interface comprises:

displaying a first control in a palm of a hand corresponding to a first gesture matching a first preset gesture in response to a detection of the first gesture;

selecting the first control in response to a detection of a second gesture matching a second preset gesture; and forming the navigation line and the application navigation interface in response to an outward movement operation starting from a position of the first control with maintaining the second gesture.

18. The electronic device according to claim 17, wherein the second gesture is a pinched posture of fingers, or the second gesture is a posture of finger pressing the first control.

19. A non-transitory computer-readable storage medium, storing a computer program which upon execution by a computer causes the computer to perform operations comprising:

displaying an application navigation interface in an extended reality space in response to a call-out instruction of the application navigation interface, wherein the application navigation interface comprises application categories displayed in category and icons or thumbnails of applications contained in the application categories; and displaying a window of a first target application selected by a selection instruction of a first target object in the extended reality space in response to the selection instruction in the application navigation interface, wherein the selection instruction is used to select applications corresponding to an application category or select an application, wherein when windows of a plurality of applications are displayed in the extended reality space, the windows of the plurality of applications are arranged to form M rows and N columns, wherein both M and N are positive integers, and at least one of M and N is greater than 1.

20. The non-transitory computer-readable storage medium according to claim 19, wherein the application navigation interface comprise opened applications and unopened applications in the extended reality XR device, and the opened applications and the unopened applications are displayed differently; and wherein the displaying the window of the first target application comprises:

when the first target application is an unopened application, starting the first target application in response to a selection command, and displaying the window of the first target application in the extended reality space, when the first target application is an opened application running a background, switching the first target application to run in a foreground in response to the selection command.

\* \* \* \* \*